(12) United States Patent
Dugan et al.

(10) Patent No.: US 6,768,850 B2
(45) Date of Patent: Jul. 27, 2004

(54) METHOD OF INDEX TRIMMING A WAVEGUIDE AND APPARATUS FORMED OF THE SAME

(75) Inventors: Mark Dugan, Ann Arbor, MI (US); William Clark, Pittsford, NY (US); Ali A. Said, Ann Arbor, MI (US); Robert L. Maynard, Gregory, MI (US); Philippe Bado, Ann Arbor, MI (US)

(73) Assignee: Translume, Inc., Ann Arbor, MI (US)

( * ) Notice: Subject to any disclaimer, the term of this patent is extended or adjusted under 35 U.S.C. 154(b) by 132 days.

(21) Appl. No.: 09/930,929

(22) Filed: Aug. 16, 2001

(65) Prior Publication Data

US 2003/0035640 A1 Feb. 20, 2003

(51) Int. Cl.$^7$ ................................................ G02B 6/02
(52) U.S. Cl. ..................................................... 385/124
(58) Field of Search ................................. 385/124–128, 385/37, 14, 130, 131, 123, 122, 141–145, 18, 115, 116, 114

(56) References Cited

U.S. PATENT DOCUMENTS

| | | | |
|---|---|---|---|
| 5,596,671 A | * | 1/1997 | Rockwell, III ............... 385/147 |
| 5,656,186 A | | 8/1997 | Mourou et al. |
| 5,761,181 A | * | 6/1998 | Nunnally ..................... 369/126 |
| 6,104,852 A | * | 8/2000 | Kashyap ....................... 385/123 |
| 6,628,877 B2 | * | 9/2003 | Dugan et al. ................ 385/129 |
| 2001/0021293 A1 | | 9/2001 | Kouta et al. |

OTHER PUBLICATIONS

Bado, "Ultrafast pulses create waveguides and microchannels," Laser Focus World 73–78 (2000).
Davis, et al. "Writing waveguides in glass with a femtosecond laser," Optics Letters 21(21):1729–1731 (1996).
Herman, et al. "Laser shaping of photonic materials: deep–ultraviolet and ultrafast lasers," Applied Surface Science 154–155:577–586 (2000).
Hill et al. "Fiber Bragg Grating Technology Fundamentals and Overview," Journal of Lightwave Technology 15(8):1263–1274 (1997).
Homoelle, et al. "Infrared photosensitivity in silica glasses exposed to femtosecond laser pulses," Optics Letters 24(18):1311–1313 (1999).
Kondo, et al. "Fabrication of long–period fiber gratings by focused irradiation of infrared femtosecond laser pulses," Optics Letters 24(10):646–648 (1999).
Korte, et al. "Sub–diffraction limited structuring of solid targets with femtosecond laser pulses," Optics Express 7(2):41–49 (2000).
Miura, et al. "Photowritten optical waveguides in various glasses with ultrashort pulse laser," Appl. Phys. Lett 71(23):3329–3331 (1997).

(List continued on next page.)

*Primary Examiner*—Jean F. Duverne
(74) *Attorney, Agent, or Firm*—Marshall, Gerstein & Borun LLP

(57) ABSTRACT

A method of using a beam of ultra-short laser pulses, having pulse durations below 10 picoseconds, to adjust an optical characteristic within an optical medium is provided. The beams would have an intensity above a threshold for altering the index of refraction of a portion of the optical medium. The beams could be selectively applied to the optical medium and any structures formed or existing therein. Thus, the beam could be moved within a waveguide in the optical medium to alter the index of refraction of the waveguide forming any number of different longitudinal index of refraction profiles. The beam could also be moved within the optical medium near the waveguide to alter an effective index of refraction of a signal traveling within the waveguide. The techniques described can be used to improve, alter or correct performance of waveguide-based optical devices, such as arrayed waveguide gratings and cascaded planar waveguide interferometers.

6 Claims, 9 Drawing Sheets

OTHER PUBLICATIONS

Quellette, "Fiber Bragg Gratings," Spie's OEmagazine 38–41 (2001).

Shihoyama, et al. "Micromachining with Ultrafast Lasers".

Sikorski, et al. "Using Femtosecond Lasers to Micromachine Integrated Optical Devices," Laser Microfabrication 1–9 (2000).

Streltsov, et al. "Fabrication and analysis of a directional coupler written in glass by nanojoule femtosecond laser pulses," Optics Letters 26(1):42–43 (2001).

Takada et al. "Low–cross–talk polarization–insensitive 10–GHz–spaced 128–channel arrayed–waveguide grating multiplexer–demultiplexer achieved with photosensitive phase adjustment," Optics Letters, 26(2):64–65 (2001).

Yamada, et al. "In situ observation of photoinduced refractive–index changes in filaments formed in glasses by femtosecond laser pulses," Optics Letters 26(1):19–21 (2001).

"Guiding Light—Optical networks of the future will have a heart of glass," New Scientist p. 21 (Apr. 21, 2001; No. 2287).

* cited by examiner

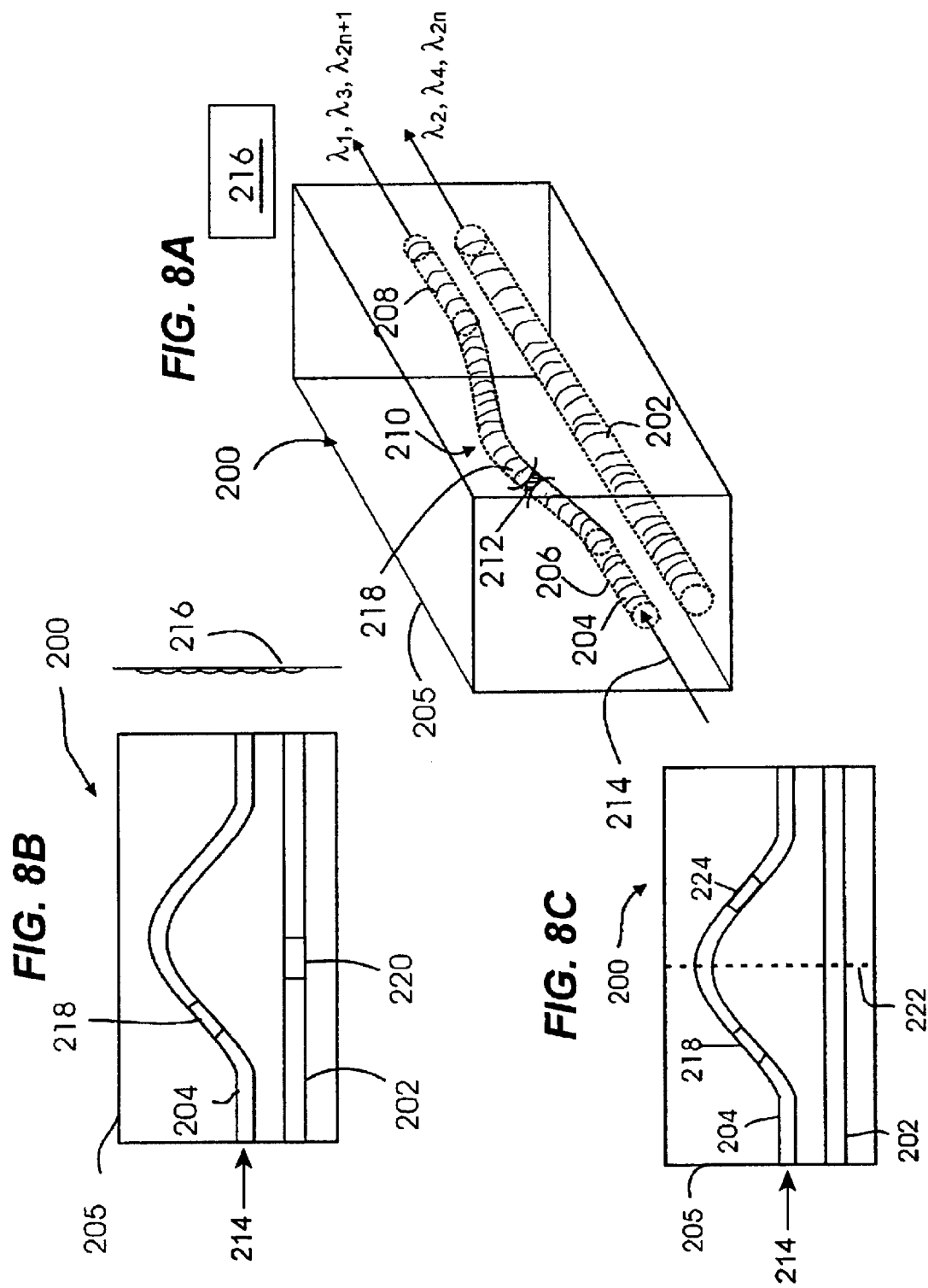

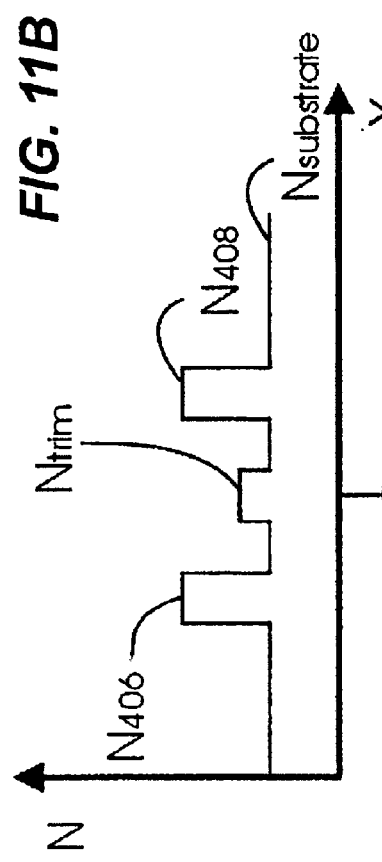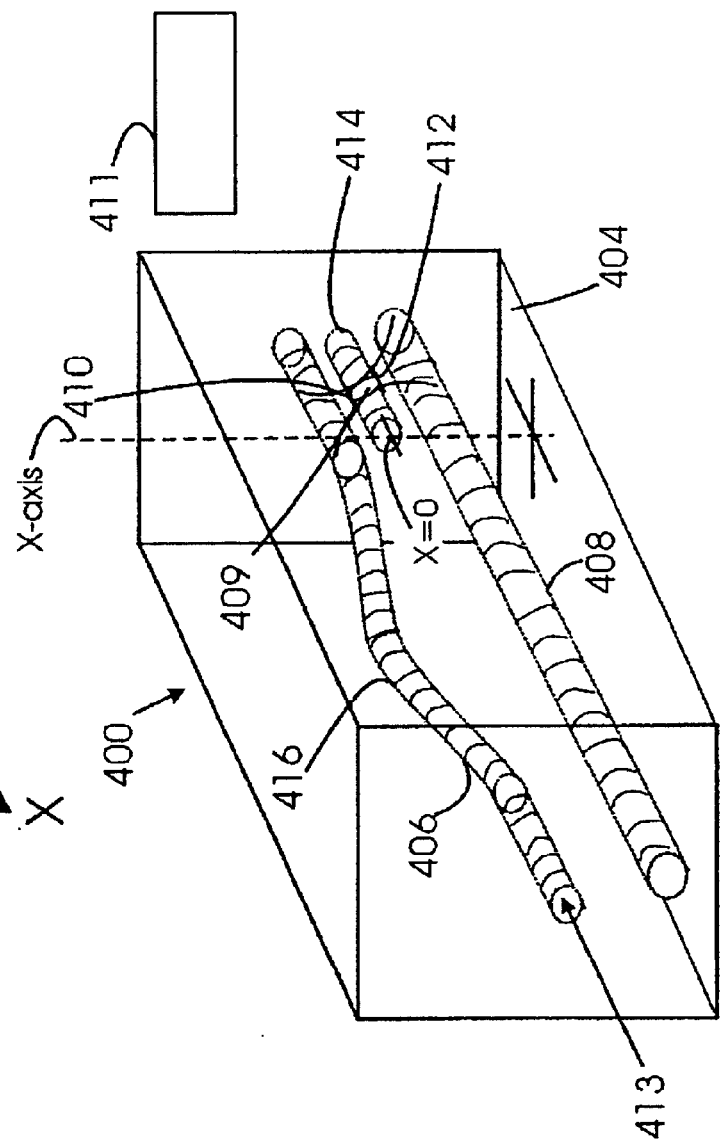

METHOD OF INDEX TRIMMING A WAVEGUIDE AND APPARATUS FORMED OF THE SAME

FIELD OF THE INVENTION

The present invention relates generally to optical waveguides and, more specifically, to a method of altering physical or optical characteristics of an optical waveguide or optical substrate and resulting apparatuses.

BACKGROUND OF THE INVENTION

As telecommunication systems grow in customer base and services, the need for bandwidth has forced many component manufacturers and system designers to increase the number of communication channels or wavelength channels traveling in optical fibers while simultaneously decreasing the wavelength spacing between these channels. As designers attempt to meet these demands, they must still ensure channel isolation and uniformity. Adding even further design constraints, wavelength selective devices, such as those used in Dense Wavelength Division Multiplexing/Demultiplexing (DWDM) and channel Add/Drop Multiplexing (ADM) systems, must maintain strict adherence to an International Telecommunications Union channel wavelength standard, the so-called ITU grid. The difficulty with meeting the demands of the marketplace while concurrently satisfying industry standards has been quite detrimental to component manufacturers. Indeed, increasing channel capacity under existing rigid industry standards, like the Telecordia certification, has greatly compromised manufacturing yields for some of the industry's most promising DWDM devices, i.e., arrayed waveguide gratings (AWG) and cascaded planar waveguide interferometers (CPWI) such as channel interleavers and slicers.

In terms of scalable channel capacity, function integration, and uniformity, AWG's and CPWI's offer greater potential for DWDM systems than thin film filters or fiber (waveguide) Bragg gratings. However, while AWG and CPWI devices have shown potential in DWDM test beds, the manufacturing yields for such structures are marginal at best making them very expensive to produce. These devices are lithographically fabricated chips of silicon on isolator (ISO) or silica on silicon (SOS) planar waveguide circuits.

The problems affecting AWG and CPWI devices are readily understandable given their operation and function. AWG's and CPWI's take in a multi-channel input signal and spatially separate out all, or a subset, of the various wavelengths, a technique also termed channel separation. These devices affect channel separation by creating a wavelength dependent interference pattern from derived replicas of the input signal propagating down two or more arrayed waveguides, each waveguide having a well defined optical path length. At the output, the positioning of the separated channels and the separation between adjacent channels is dependent upon both signal recombination and the phase differential acquired between the replica signals traveling through the different waveguides. Therefore, proper device operation is dependent upon the differences in optical path length, induced phase shift and both the absolute and relative signal amplitude between these waveguides. For example, if waveguides have even slightly incorrect optical path lengths, they may induce the wrong phase shifts on the propagating signals resulting in an offset between the measured channel wavelength and the ITU grid. Alternatively, an imbalance in the initial signal level between the waveguides (unbalanced signal loading) in AWG's and CPWI's will compromise channel isolation and uniformity. These problems are accelerated as the number of waveguides in a device increases.

The optical path length difference or phase difference is not only a function of differences in physical length between waveguides, but also differences in the index of refraction between waveguides. In fact, index of refraction variation throughout the substrate or bulk optical material is a substantial limitation to many multi-waveguide structures, because it has heretofore been generally difficult to accurately identify where the variations occur. Furthermore, the index of refraction is temperature dependent, and since AWG and CPWI devices, and other multiple waveguide structures for that matter, are to function in numerous field conditions variations in index of refraction can be exacerbated under temperature changes. For example, an AWG device could be minimally within industry standards at one temperature and fail those same standards when operated at another temperature. While it is always desirable to minimize the affects of temperature on device operation, such minimization is extremely difficult when concerned with waveguides having even slightly different indexes of refraction. Further failures due to errors acquired in the signal phase and amplitude of DWDM interference-based devices can arise from any polarization dependence. This dependence can affect both the signal throughput as in polarization dependent loss (PDL) and the wavelength response of the signal throughput as in a polarization dependent frequency (PDF). Also the unbalanced loss between waveguides (unbalanced channel loss) can result in device failure.

Based on the foregoing, there is a need for a method of correcting or changing the index of refraction within an optical waveguide in a spatially controlled manner and to do so in a procedure amenable to a post processing, quality control stage of device manufacture. There is also a need for a technique that corrects defects in known waveguide structures, defects like optical path length errors, unbalanced signal loading, PDL, PDF, unbalanced channel loss, and others. Further, there is a need for optical devices that exhibit such corrected defects.

SUMMARY OF THE INVENTION

In accordance with an embodiment, provided is a method of coupling a first waveguide and a second waveguide, wherein at least one of the first and second waveguides exists within an optical medium. The method includes the step of generating ultra-short laser pulses. Further, the method includes the step of applying a signal to the first waveguide and the second waveguide for measuring an output derived from the first waveguide and the second waveguide, the output being indicative of a performance metric of the first waveguide and the second waveguide. The method also includes the steps of, in response to the measured output, directing the ultra-short laser pulses within the bulk of the optical medium to write a facilitator segment such that the facilitator segment is within an evanescent coupling region of the first waveguide and within an evanescent coupling region of the second waveguide.

In another embodiment, provided is a method of coupling a first waveguide and a second waveguide, wherein at least one of the first and second waveguides exists within an optical medium. The method includes the step of generating ultra-short laser pulses. Further, the method includes the step of applying a signal to the first waveguide and the second waveguide for measuring an output derived from the first waveguide and the second waveguide, the output being indicative of a performance metric of the first waveguide and the second waveguide. The method also includes the steps of, in response to the measured output, directing the ultra-short laser pulses within the bulk of the optical medium to write a facilitator segment such that the facilitator segment is within an evanescent coupling region of the first waveguide and within an evanescent coupling region of the second waveguide.

In yet another embodiment, provided is a method of forming a graduated change in the index of refraction of a waveguide. The method comprises the steps of generating ultra-short laser pulses and scanning the ultra-short laser pulses over overlapping segments within the waveguide to form a desired axial index of refraction profile within the waveguide. In some of these embodiments, the axial index of refraction profile is a graded, step-wise, or corrugated profile.

In a further embodiment, provided is a method of repairing a defective waveguide comprising the steps of (A) applying an input signal to the defective waveguide and (B) detecting an output signal from the defective waveguide, the output signal being generated by the input signal. Additionally, the method includes the steps of (C) selecting a location associated with the defective waveguide and (D) applying a focused ultra-short laser pulse to the selected location to modify a characteristic of the waveguide. The method also includes the step of repeating at least some of steps (A)–(D) until the output signal from the defective waveguide indicates that the defective waveguide has been repaired.

In accordance with another embodiment, an optical device is provided having an optical medium; a first waveguide disposed in-bulk in the optical medium and having a cross-sectional refractive index profile; and a second waveguide disposed in-bulk in the optical medium and having a cross-sectional refractive index profile. A signal is transmitted in the optical device in a propagation direction, wherein the cross-sectional refractive index profile of the second waveguide is selectively varied along the propagation direction to cooperate with the cross-sectional refractive index profile of the first waveguide to produce a desired output of the optical device.

In accordance with another embodiment, provided is an optical device having an optical medium and a waveguide having a first segment and a second segment wherein the first and second segments are disposed in-bulk in the optical medium and have a respective cross-sectional refractive index profile. The cross-sectional refractive index profile of the first segment differs from the cross-sectional refractive index profile of the second segment such that the waveguide is polarization-selective.

BRIEF DESCRIPTION OF THE DRAWINGS

FIG. 8A is an illustration of a portion of an interleaver with a trimmed segment formed in one of the waveguides.

FIG. 8B is a cross-sectional view of the interleaver of FIG. 8A having a second trimmed segment formed in another of the waveguides.

FIG. 8C is a cross-sectional view of the interleaver of FIG. 8A having two trimmed segments formed in one of the waveguides.

FIG. 10 is an illustration of using a near-waveguide trimming technique to affect operation of a portion of an optical interleaver having two waveguides within an optical substrate.

FIG. 11B is a plot of index of refraction profile for the structure of FIG. 11A.

DETAILED DESCRIPTION OF PREFERRED EMBODIMENTS

Figure 1:
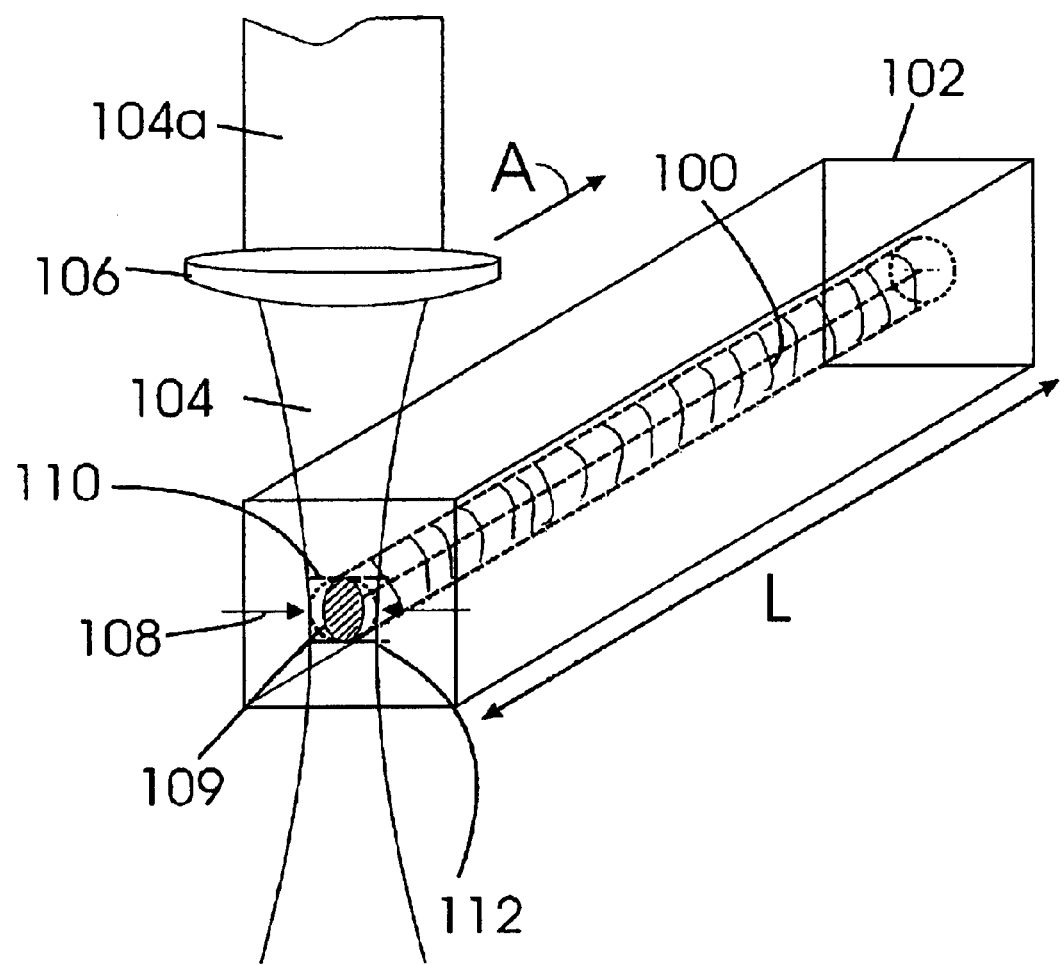
FIG. 1 is an illustration of an ultra-short pulse laser beam focused within a waveguide existing within a substrate in accordance with an in-waveguide trimming technique disclosed herein.

Provided herein below are methods of addressing the various above-described problems, including the problems of optical path length errors, unbalanced signal loading, PDL, PDF, and unbalanced channel loss in single and multiple waveguide devices. The methods described may be used to affect an optical characteristic of a waveguide, whether that waveguide be formed at or near a surface of an optical substrate, such as with a planar waveguide, or within the bulk of a single or multi-layer substrate. Primarily, the optical characteristic is the local index of refraction within or near the waveguide or the effective index of refraction of a signal propagating through the waveguide structure. With respect to the latter, the transverse shape or mode profile of the signal extends into the substrate beyond the transverse dimensions of the waveguide, a region referred to as the evanescent region. The effective index of refraction, therefore, represents the local index of refraction variation over the mode profile of a signal. For a single mode waveguide, the signal profile associated with the effective index of refraction is that of the fundamental mode. In a multimode waveguide an effective index of refraction can be associated with all waveguide modes activated by the propagating signal. The effective index of refraction is, therefore, also dependent on properties of the signal, such as wavelength. In fact, the effective index of refraction is used to define waveguide dispersion for a given mode of a propagating signal. Herein the effective index of refraction of a signal will represent that of the fundamental mode in a single mode waveguide or the net effective index of refraction of all active modes in a multimode waveguide. In any event, it will be apparent below that in some embodiments the effective index of refraction of a signal may be altered without altering the index of refraction profile within a waveguide. The embodiments described below are also useful in creating many types of waveguide-based structures, some of which are described and depicted below.

Generally, the embodiments described hereinbelow take advantage of the direct-write capability of ultra-short pulsed lasers. Ultra-short laser pulses are herein defined to include laser pulses below 10 picoseconds in duration, and include sub-100 femtosecond laser pulses. Lasers suitable for generating ultra-short pulses are generally available from a number of companies and other sources, including Coherent, Inc. (Santa Clara, Calif.) and the trade name "RegA" and Spectra Physics (Mountain View, Calif.) under the trade name "Tsunami." Such ultra-short pulsed lasers can typically achieve pulse widths of less than 100 femtosecond. Direct-writing within an optical material can be achieved with pulse energies of nano-Joules to several micro-Joules depending on the pulse widths.

In the embodiments below, an index trimming is performed using a beam of ultra-short laser pulses. As will be discussed, index trimming can occur in any portion of an optical material or medium. Further, the trimming may be affected in the bulk of an optical medium or below the surface (or passivation layer or planarization layer) of a planar waveguide. Typically, the trimming will be performed uniformly over a cross-sectional area of the waveguide so as not to induce a polarization dependence therein. Alternatively, a polarization dependence not originally present can be induced through nonuniform or patterned trimming over the cross-sectional area of the waveguide. In the majority of optical materials (e.g., glasses), the trimmed index change will be insensitive to the polarization state of the ultra-short laser pulses. However, a subclass of potentially useful optical materials exists where a material specific optical anisotropy or birefringence can be induced by and is dependent upon the polarization of the ultra-short laser pulses. In these materials, optical isotropy can be maintained during the trimming process through the use of a circularly polarized or an unpolarized laser beam.

To address the optical path length error, unbalanced signal loading, PDL, PDF, and unbalanced loss problems described above, many of the disclosed methods involve affecting the optical properties of a waveguide. Waveguides existing within the bulk, on the surface of an optical substrate, or otherwise are contemplated. For the purposes here, any suitable means of fabrication could have been used to create the waveguide. Exemplary suitable techniques include photolithography, flame hydrolysis deposition, modified chemical vapor deposition, direct writing with ultra-fast laser pulses, diffusion, and ion implantation. Furthermore, the techniques of affecting the properties of a waveguide described herein may be implemented during waveguide processing as, for instance, a post-processing quality step, or can be concurrent with processing for the case of direct-write manufacturing.

Generally, to improve, alter or correct performance of defective devices, a trimming is performed to modify the index of refraction in a localized region or different local regions of the existing waveguide by applying the ultra-short pulses within the waveguide, near the waveguide, or some combination of both and directing the movement of the ultra-short pulses therein. As will be apparent, the trimming technique is controllable in that one can trim any portion of a waveguide in both longitudinal or axial (i.e., along the main or propagation axis of the waveguide) and transverse (i.e., orthogonal to the main waveguide axis) directions. In fact, the localized region of the waveguide may constitute any region from a portion of the cross section of the waveguide to the entire waveguide structure itself. The disclosed embodiments, however, are not limited to trimming only a waveguide core or surrounding cladding, but also include generally forming waveguide structures within the bulk of an optical substrate.

FIG. 1 shows an initial step in trimming a waveguide 100 existing in the bulk of an optical substrate 102. Alternatively, the waveguide 100 could be part of a waveguide device such as an AWG, Mach Zehnder Interleaver, or another type of waveguide structure like an optical fiber. And as stated above the waveguide could be formed in the substrate 102 using numerous techniques, and while the substrate 102 is shown as a single structure, it could alternatively be made of multiple substrates sandwiched together to house the waveguide 100. In the preferred embodiment, the waveguide 100 is formed of the same or similar material as the substrate 102 and that would be any suitable optical material (like glass) transparent or substantially transparent at 800 nm, the preferred wavelength of the beam of ultra-short laser pulses used herein, and at 1300 nm or 1550 nm, the preferred wavelengths in telecommunications for signals traveling within waveguides. A waveguide, however, could be formed of a separate material from the surrounding substrate, an example being a planar waveguide grown on a silicon wafer and having a separate material planarization or passivation layer disposed thereon. Here, the surrounding layer(s), at least the surrounding layer(s) exposed to the laser writing source, and the waveguide should be transparent or substantially transparent at the writing wavelength (i.e., preferably 800 nm), but only the waveguide need be transparent or substantially transparent at the preferred telecommunications wavelengths.

To trim the waveguide 100, a beam of ultra-short pulses of light 104a is focused by a lens 106 into the substrate 102, or more specifically in the substrate 102 at a position coinciding with the waveguide 100. Generally, the waveguide 100 could be either square or rectangular in cross-sectional shape or elliptical or circular in cross-sectional shape, as shown. The spatial profile of the preferred beam of ultra-short pulses 104 has a Gaussian $TEM_{oo}$ intensity profile and is focused by the lens 106 to a Gaussian beam waist 108. In addition, the focused beam 104 is characterized by a Rayleigh range or depth of focus approximately extending between lines 110 and 112, which together with the beam waist 108 confine a confocal volume. The focused beam 104 of ultra-short pulses constitutes a peak intensity profile over a confocal volume, at least a portion of which is sufficiently intense to induce a changed index of refraction profile over an affected volume within the waveguide 100 or substrate 102. As typically only a portion of the confocal volume is of sufficient intensity to induce the affected volume, an effective region within the confocal region is exemplarily shown as an ellipsoid 109. The cross-sectional shape of the affected volume in the waveguide 100, for example, would coincide with this effective confocal region 109.

Generally, it is believed that a multi-photon absorption (i.e., at least two photon-absorption) due to the high peak intensity of a beam results in the change in the index of refraction profile. The nonlinear nature of this process localizes the resultant index of refraction change from that of the focused intensity profile. That is, it has been observed that a beam induced affected volume, within which the index change would result, can be made smaller than the beam confocal volume. Furthermore, data suggests that the index of refraction change induced by exposing an optical substrate or waveguide material to the ultra-short pulsed laser beam is a threshold phenomenon, where below a particular intensity the material is substantially unchanged and above the intensity there is a noticeable index change. It has also been observed that increasing the intensity will result in higher changes to the index of refraction up to a saturation point or a point where material damage from ablation occurs. This upper intensity limit is partially material dependent. It has also been observed that changing the illumination, or exposure, time (at a given intensity) will result in higher changes to the index of refraction. Increasing the illumination time can be done by changing the scanning speed of the beam, by changing the writing laser's repetition rate, for example, or by illuminating the same spatial segment many times at a given intensity.

The aforementioned nonlinear nature of the index of refraction changing process results in an affected volume dependent, in part, on ultra-short pulse energy, pulse width, as well as the confocal volume (or effective confocal region). For the Gaussian beam focus and at a lower beam intensity, the effective confocal region (or volume) becomes approximately spherical in shape with a diameter less than or equal to the beam waist. Upon increasing the beam energy and/or decreasing the pulse width, the effective confocal region approaches an ellipsoid with major axis along the beam direction, as shown in FIG. 1. As the beam intensity is further raised, the effective confocal region acquires an hour glass shape (parabolic ellipsoid) eventually ceasing to change upon reaching saturation or ablative material damage. The effective confocal region may also be larger than the optical confocal region under certain circumstances, as well.

The relevant cross-section of the affected volume, defined as that cross-section orthogonal to the relative direction of movement of the beam focus, can be made larger than the cross-sectional dimensions of the waveguide, i.e., the diameter of the waveguide, but ideally is made smaller to allow greater flexibility in selectively trimming the waveguide.

Returning to FIG. 1, the relevant cross-section of the effective confocal region is depicted as the shaded elliptical area 109 for a perpendicular (laser beam to main waveguide axis) configuration. As previously stated, the trimming can be performed by moving the effective confocal region longitudinally, or axially along the waveguide, as shown by the arrow A or transversely (see, FIG. 3) to form an elongated affected volume. The depicted configuration is with the beam 104 incident transversely to the waveguide 100. Alternatively, the relevant cross-section of the effective confocal region can be orthogonal to that shown in FIG. 1 (now defined by the two minor axis of the ellipsoidal) by using an on-axis configuration in which the beam 104 is incident upon the waveguide 100 along the longitudinal axis of the waveguide 100. Here, as well, trimming either longitudinally or transversely is contemplated. In any event, the positioning of the laser beam confocal volume (ultimately the effective confocal region 109) is achieved by the lens 106 characterized by the appropriate working distance and numerical aperture. The focal characteristics could result, however, from a pattern encoded onto a phase front of the collimated beam 104a incident upon the lens 106, as would occur by using a mask or diffractive optical element prior to focusing the collimated beam 104a into the substrate 102. An affected volume within the substrate 102 or waveguide 100 having any one of a number of shapes could be created with this alternative technique, in addition to the ones derived from the effective confocal regions described above.

As can be seen, the beam 104 is focused into the waveguide 100 from a direction perpendicular to the length of the waveguide. In such an apparatus, the beam 104 may be longitudinally scanned along the axis of the waveguide 100, by either moving the substrate 102 relative to the beam 104, moving the collimated beam 104 and the focusing lens 106 relative to the optical substrate 102, or some combination of both. The relative movements described hereinbelow generally can be affected by many known means, such as three dimensional translation stages with or without rotational degrees of movement, and as will be appreciated optical aligned translation/rotation stages having a very high degree of accuracy. Additionally, the movement of the beam 104 would be motorized and controlled by a computer or other type of controller, in the preferred embodiment.

Figure 2:
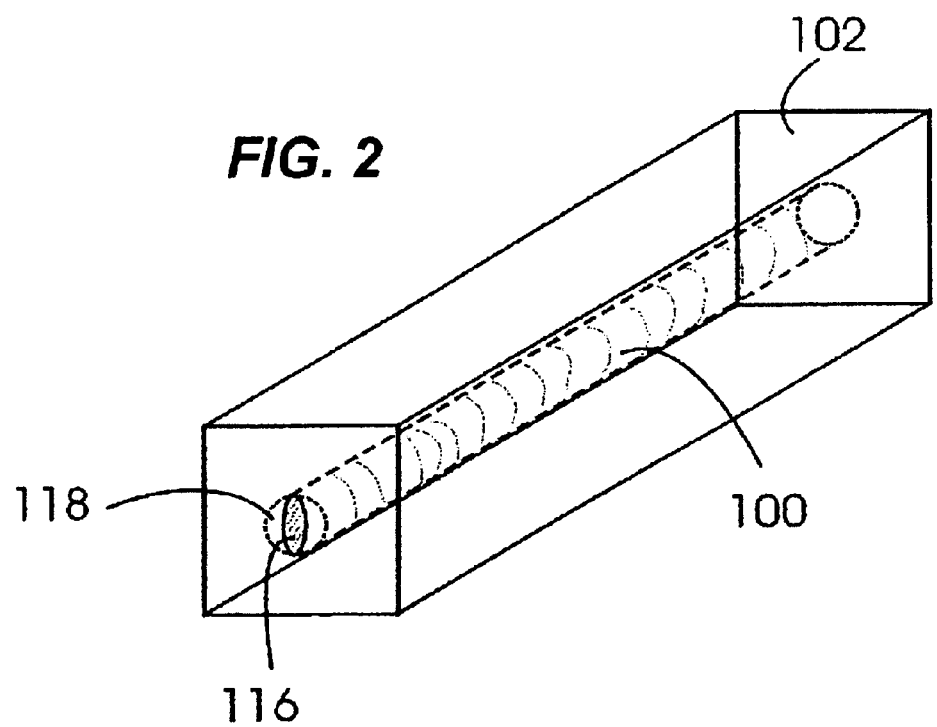
FIG. 2 is an illustration of an affected volume formed within the waveguide of FIG. 1 using an exemplary in-waveguide trimming technique.

Trimming of the waveguide will result from longitudinal movement or back and forth scanning. FIG. 2 illustrates the waveguide 100 after a trimmed, elliptically shaped inner trimmed core, or affected volume 116, has been formed therein by longitudinal movement of the beam 104 along the main waveguide axis. Within the affected volume 116, the optical characteristics of the waveguide 100 have been altered, in particular the affected volume 116 will have on average a higher index of refraction than the un-affected portions of the waveguide 100, indicated by reference number 118. To increase the index of refraction differential between regions 116 and 118, the beam 104 can be made to make multiple scans along the waveguide 100. The index changing effect, however, would eventually become saturated, as discussed above, or ultimately become limited by the onset of material destruction.

For symmetry purposes, the affected volume 116 is concentric with the waveguide 100, though this need not be the case. Further, due to the elliptical shape, the affected volume 116 will have an induced anisotropic index of refraction change that gives rise to a birefringence in the waveguide 100. That is, the index of refraction at a given transverse cross-section of the waveguide 100, will not be the same along two orthogonal axes. Thus, the trimming performed in FIGS. 1 and 2 can convert an isotropic waveguide into a waveguide having an anisotropic inner region, or in other words, a non-polarization sensitive waveguide may be made polarization sensitive using the disclosed techniques.

Figure 3:
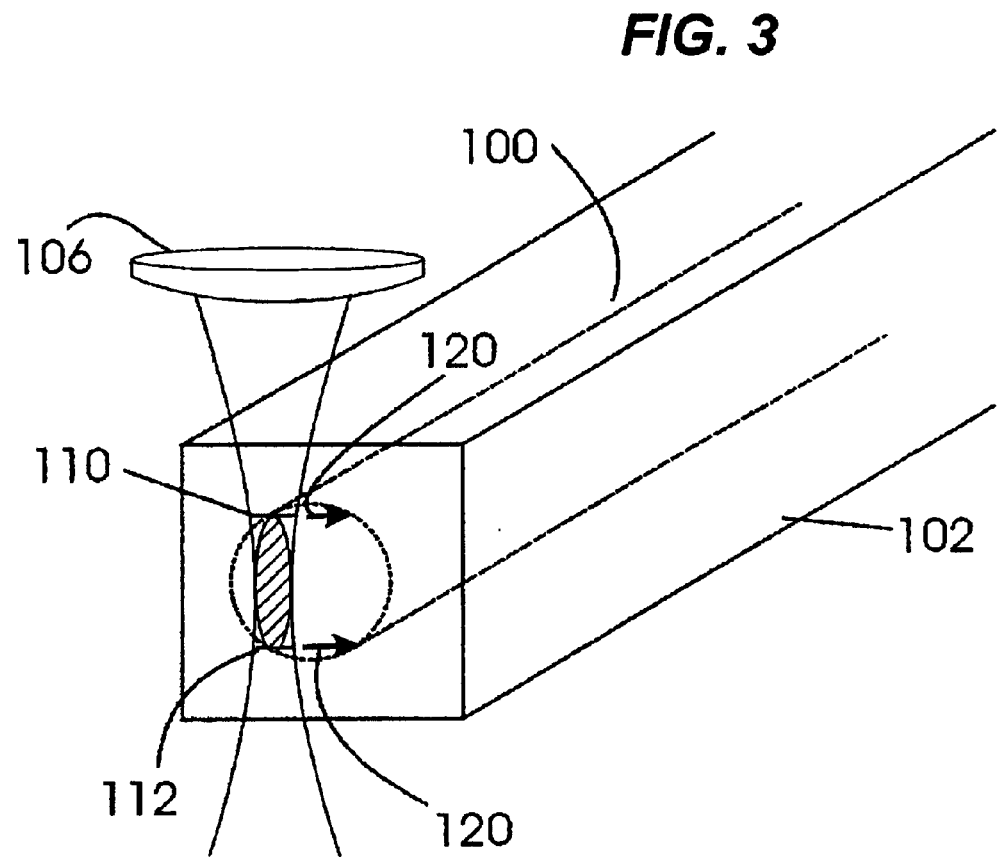
FIG. 3 is an illustration of the transverse trimming movement of a beam of ultra-short laser pulses to create an isotropic affected volume.
Figure 4:
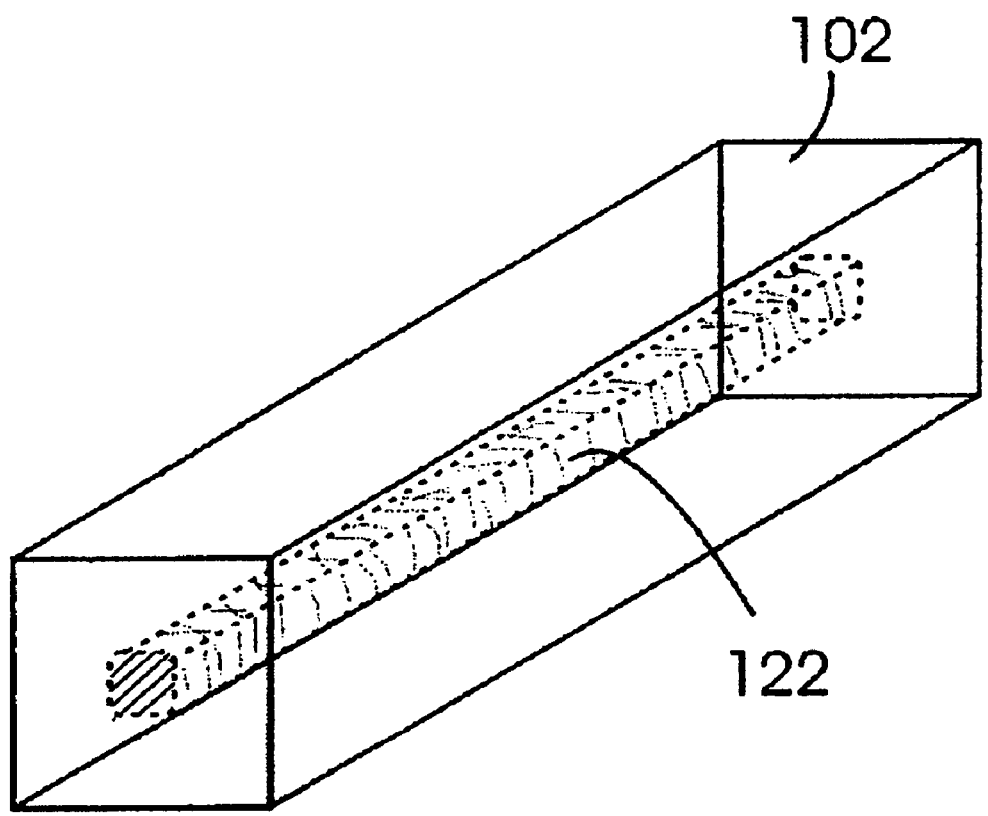
FIG. 4 is an illustration showing an exemplary completed isotopically trimmed affected volume.

To reduce the birefringence induced in FIG. 2, if so desired, and make the index of refraction change within the waveguide 100 more uniform over the entire cross-sectional area, the beam 104 can be made to move in a transverse direction across the waveguide 100 as well. FIG. 3 illustrates an exemplary direction of this transverse movement by arrows 120, though any movement transverse to the waveguide axis is contemplated. As the confocal region of the beam 104 is smaller than the dimensions of the cross-sectional area of the waveguide 100, the beam 104 may be scanned across the waveguide 100 to evenly expose the entire cross-section thereof to the beam 104. One of the advantages of having an elliptical shaped beam is that it can be scanned across both a rectangular-shaped waveguide and a circular-shaped waveguide and substantially and evenly increase the index of refraction uniformly in either. FIG. 4 shows a resulting waveguide 122 that has an isotropic index of refraction. As with the longitudinal movement described in FIG. 2, the transverse movement may be affected by numerous known translation means, with or without rotational movement capabilities. Uniform coverage of the entire waveguide 100 would encompass both transverse and longitudinal movement.

Figure 5:
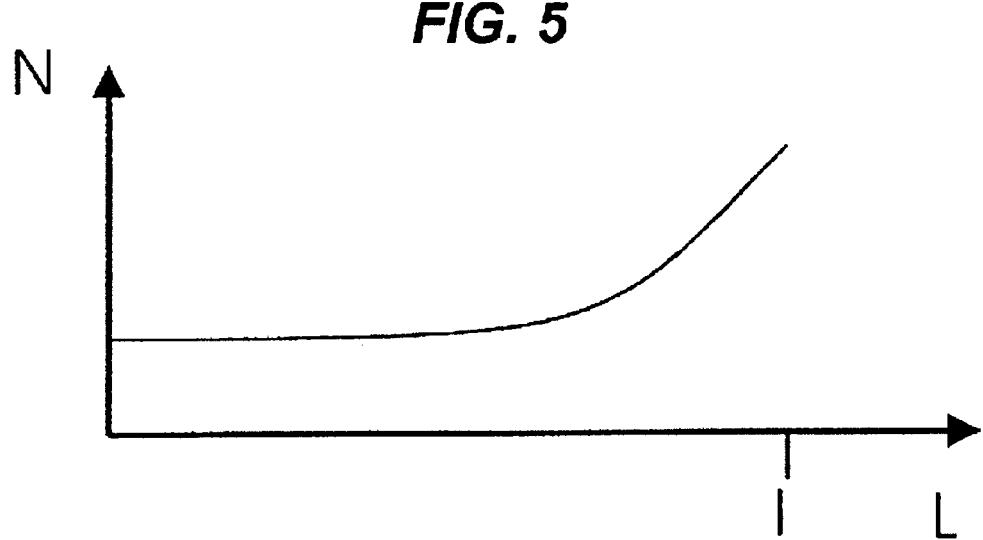
FIG. 5 is a plot of a longitudinal index of refraction profile of an exemplary trimming application, showing a trimmed graded index of refraction.

The techniques described above can be used to affect a great many different types of index changes within a waveguide. A graded index change to the longitudinal index of refraction profile can be induced by gradually increasing the power of the writing beam while scanning longitudinally along the axis of the waveguide, with more intense beams inducing a greater change in the index of refraction. This procedure would allow adiabatic mode conversion without reflection loss along the waveguide. A plot of the index of refraction along a length of a waveguide exposed to an increasingly more intense writing beam from a first end of a wavelength, L=0, to second end, L=1, is shown in FIG. 5. The index profile of FIG. 5 could also be created by repeatedly scanning (i.e., retracing) within a waveguide over increasingly smaller, but overlapping portions of a waveguide. This latter trimming technique could also create a stair-step index of refraction profile by adjusting the extent of this retracing.

Figure 6:
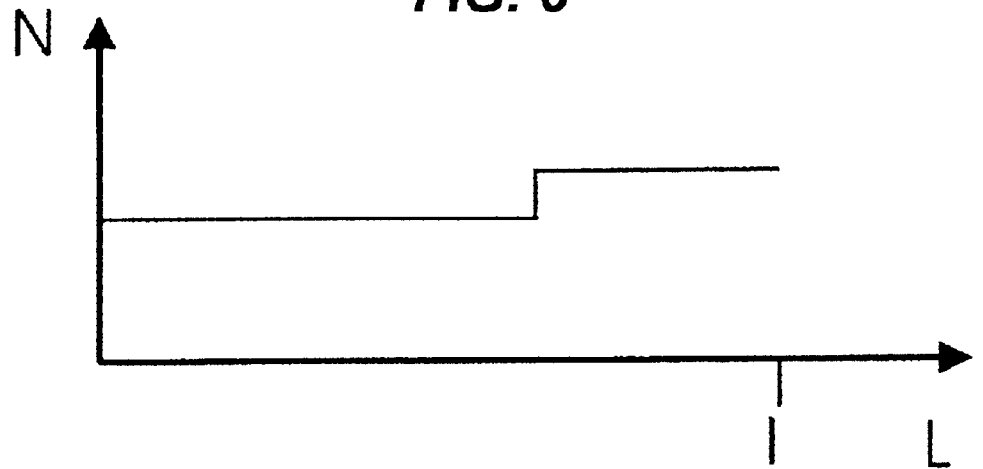
FIG. 6 is a plot of a longitudinal index of refraction profile of an exemplary trimming application, showing a trimmed stepwise index of refraction.

An abrupt change can be trimmed into a waveguide to induce reflection loss in a controlled manner, as might be desired for balancing losses between channels in a multi-waveguide AWG. FIG. 6 plots an exemplary longitudinal index of refraction profile. The abrupt change in index of refraction will induce some reflection loss into a waveguide. Therefore, this technique may be used with multiple waveguide devices to balance losses between waveguides by introducing a reflection loss into a waveguide that previously had less loss than other waveguides, a particularly useful technique in correcting defective AWGs and CPWIs.

Figure 7:
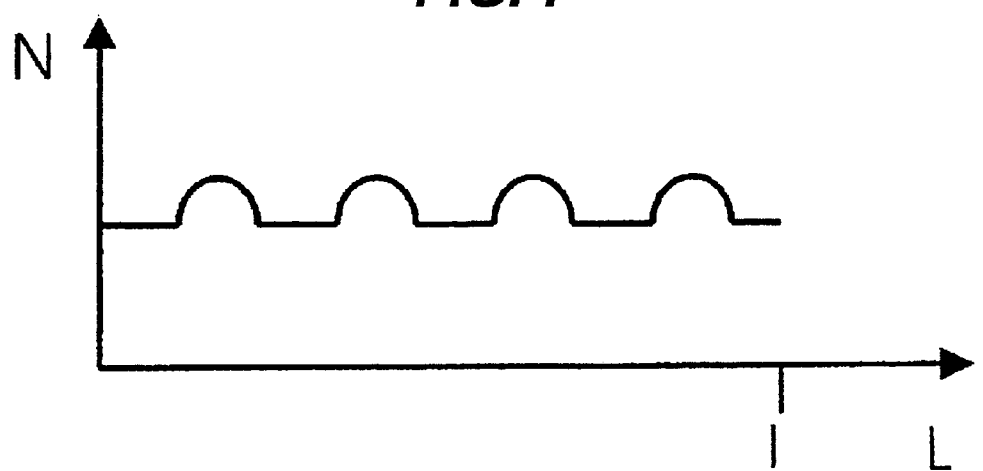
FIG. 7 is a plot of a longitudinal index of refraction profile of an exemplary trimming application, showing the results of an amplitude modulation of a beam of ultra-short laser pulses during an in-waveguide trimming.

Even further, the in-waveguide scanning described above can be combined with an amplitude modulation of the writing beam (e.g., beam 104) to create periodic (or aperiodic) regions with varying index of refraction profiles. An exemplary longitudinal index of refraction profile is shown in FIG. 7 displaying a waveguide that may act like a wavelength dependent intra-waveguide distributed Bragg reflector (DBR) or Bragg grating (both unchirped and chirped). Of course, numerous other waveguide index of refraction profiles may be achieved with the present trimming techniques. The index of refraction profile changes may be transverse, as well, resulting in variations in the index of refraction profile at a particular cross-section. The plots of FIGS. 5–7 already show variations in the index of refraction profile at different cross-sections of a waveguide. Thus, it should now be apparent that varying cross-sectional index of refraction profiles may be formed in the same waveguide. For example, there may be a first cross-section profile having a step characteristic and a second cross-section profile having a different step characteristic or a Gaussian profile or other profile.

It is now possible to selectively form various index of refraction profiles, both longitudinally and transversely within a waveguide. Further, often waveguides are merely a component of an optical device. In such cases, it may be desirable to alter the index of refraction of the waveguide to achieve a desired output of the optical device. FIG. 8A shows a portion of an optical device, an interleaver 200, in which the waveguide trimming technique described above may be used to improve or correct performance of a defective device.

As described previously, multiple-waveguide devices, especially those used with DWDM applications to affect many closely spaced channels, suffer greatly from inexactness in optical path length differences between waveguides. This problem is true in devices that rely on interference between signals. Waveguide interferometers such as channel interleavers and slicers are examples of structures that have suffered low production yields due to incorrect path lengths. In their basic form, these devices are unbalanced Mach Zehnder interferometers consisting of a waveguide coupler or splitter at both the input and output sections and separated by a section of at least two uncoupled waveguides of different path lengths. Thus, an interleaver can be considered an interferometric device formed of an input coupler/splitter, a differential phase stage, and an output coupler/combiner. Such a structure could be bidirectional. The input coupler/splitter populates the two uncoupled waveguides of the differential phase region with the input signal. Propagation through the two waveguides of different path length establishes the phase differential between the propagating signals. The signals are recombined at the output coupler/combiner resulting in a wavelength modulated transfer function. The action of such an interleaver is to affect channel multiplexing where two multi-channel input signals with complimentary odd/even wavelengths are combined into one output at half the channel spacing of the input signals. Alternatively, the action of the slicer is to affect channel demultiplexing where a multi-channel input signal is split into two signals in separate output waveguides with complimentary odd/even wavelengths at twice the channel spacing as the input signal. As it is possible to represent these two functions (channel interleaving and slicing) by a single device, they will be referred to as simply an interleaver herein.

FIG. 8A shows only a portion of an interleaver. In this basic form, the interleaver 200 has two waveguides 202 and 204 existing in a substrate 205—the first waveguide 202 typically having a straight waveguide segment and the second waveguide 204 being of a longer physical length. Here, the waveguide 204 has two straight segments 206 and 208 that are within a coupling region of the first waveguide 202 and an arcuate segment 210 that is substantially out of coupling contact therewith. The entrance end of the interleaver 200, i.e., with segment 206 and the corresponding portion of waveguide 202 coupled thereto, could be part of an input coupler having two uncoupled waveguides not shown. The exit end of the interleaver 200, i.e., with segment 208 and the corresponding portion of waveguide 202 coupled thereto, could be part of an output coupler having two uncoupled waveguides also not shown. The arcuate segment 210 having a longer optical path length than waveguide 202 over the coupled region therebetween defines a differential phase region of the interleaver 200.

The interleaver 200 can receive a multiple channel input signal and, when operating properly at a particular phase bias and at a 50% coupling ratio between the two waveguides 202, 204 in both the input and output regions, output even numbered channels ($\lambda_2, \lambda_4, \lambda_6 \ldots$) out of the first waveguide 202 and odd numbered channels ($\lambda_1, \lambda_3, \lambda_5 \ldots$) out of the second waveguide 204. When there is not 50% coupling, for example, the waveguide 204 could include a small amount of even channel energy along with the odd channel, which translates into a less than ideal channel isolation.

The waveguide trimming technique can be used to adjust the optical path length of the second waveguide 204 relative to the first waveguide 202 by first aligning an ultra-short laser pulse beam 212 within the second waveguide 204. To diagnosis problems with interleaver operation, a reference beam 214 is coupled into waveguide 204 resulting in a output pattern of the interleaver 200 and is generally labeled as 216. This pattern, representing the transfer response of the device, is generated by making the reference beam 214 a relatively low power, broadband (pulsed or nonpulsed) signal centered over a telecommunications relevant wavelength range (such as the so called C, L, or S-bands). The output from both waveguides 202 and 204 is spectrally analyzed yielding an interference pattern characterized by a series of signal peaks (maxima) and signal valleys (minima). In this case, a performance metric can be defined as the mismatch between the measured wavelength positioning of the signal peaks and that of a specified wavelength standard, such as the ITU-grid. Other necessary performance specifications are defined as the signal peak-to-valley contrast (signal isolation) and the consistency of this contrast and peak positioning over the relevant bandwidth range (signal uniformity). More is described regarding this closed-loop trimming in response to a performance metric below. While monitoring the output pattern 216, the beam 212 is made to scan a portion (or affected volume) 218 of the second waveguide 204 thereby increasing the index of refraction in the portion 218 until the pattern 216 shows a desired pattern (i.e. channel alignment with the ITU-grid), indicating that the path lengths of the two waveguides 202 and 204 properly correlate.

As generally only one waveguide need be altered, the first waveguide 202 may also be considered a reference waveguide. Note, however, with this structure the exact optical path length or phase change of any particular waveguide need not be known, only the relative phase change differences between waveguides need be affected. Thus, what is shown is a technique for altering the properties of the waveguide 204 in response to a measuring of the output pattern 216, until the output pattern displays a desired interleaved output. Many alternatives could be employed, for example, the waveguides 202 and 204 could be formed in different optical substrates or the waveguides 202 and 204 could have different shapes (e.g., with waveguide 202 having an arcuate portion to further compact the device). In fact, the input coupler used with the interleaver portion shown as 200 in FIG. 8A could be a single waveguide split into waveguides 202 and 204. Such a Y-splitter used with a differential phase stage to form an interleaver could be advantageous in certain applications. Other alternatives would include different differential phase stages. Geometric, or physical, changes between waveguide is shown, but time delays between waveguide segments can result from using birefringent materials or through other known means. These stages may also be affected by the now-disclosed trimming.

While it is possible to scan only the portion 218 and induce sufficient enough index change to improve operation of the defective device, in an alternative embodiment two portions (or affected volumes) 218 and 220 would be trimmed (see, FIG. 8B). Two-portion trimming is particularly advantageous in interleavers that are defective or operate marginally due to PDF. The two trimmed portions 218 and 220 can be within the same waveguide or, as shown in the preferred embodiment, in separate waveguides 202, 204. Here, the beam confocal region is made to be within the waveguide transverse cross-section and moved longitudinally with or without a transverse component, as to induce a nonuniform trimmed index of refraction along the axis of the particular waveguide. The procedure is varied in both portions 218 and 220 so as to induce compensated birefringences and to induce the correct optical path length difference between the waveguides 202, 204 yielding the desired output pattern 216. Preferably, the two signals 218 and 220 are formed in uncoupled portion of the waveguides 202, 204. The ability to trim two segments in different waveguides and thereby induce compensated birefringences that reduce polarization dependence (PDF and PDL) within an interleaver eliminates the need for waveplates. Nevertheless, the technique described can also be used to benefit existing interleavers that have waveplates.

To minimize PDF in existing devices, manufacturers have traditionally inserted a half waveplate spanning the two waveguides 202, 204 at the center point (shown by dashed line 222 FIG. 8C). Here, an alternative, two-portion trimming in one waveguide would be particularly advantageous to minimize any polarization dependence created by the formation of the first portion 218 on one side of the waveplate 222 and a second portion 224 on the other side of the waveplate 222. The two portions 218 and 220 would be trimmed identically on both sides of the waveplate 222 and in the same waveguide so that the polarization rotation from the waveplate will cancel any polarization dependence induced by the trimming.

Figure 9A:
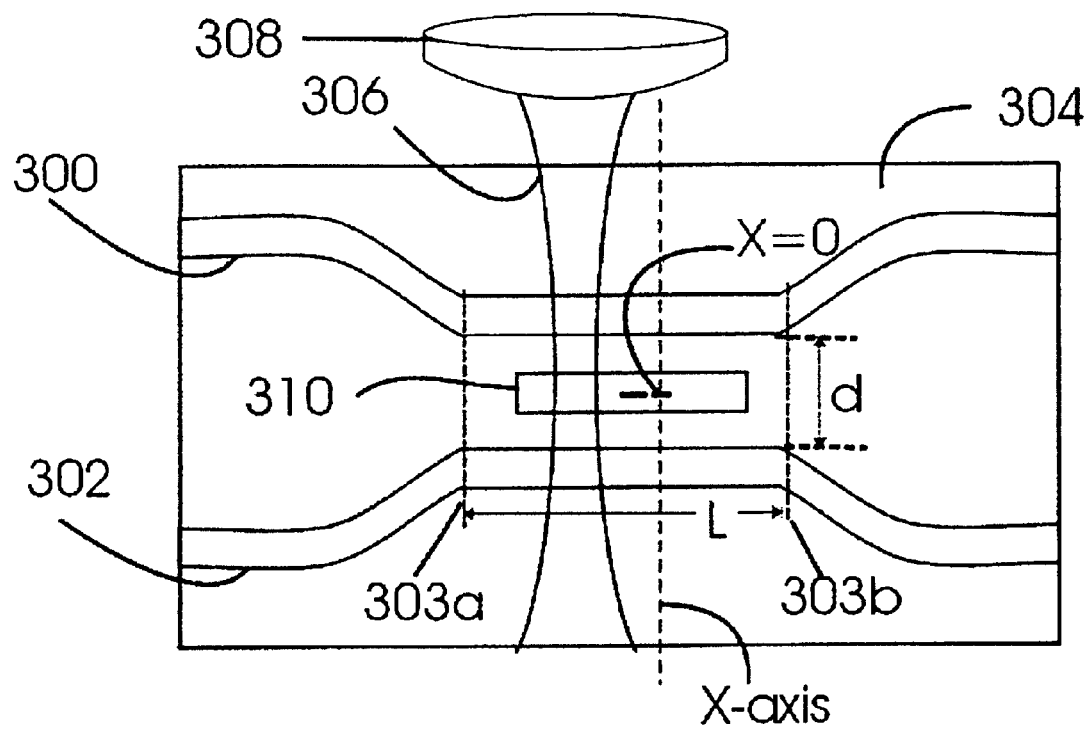
FIG. 9A is a cross-sectional illustration of an optical device and an alternative near-waveguide trimming technique.

Above, some exemplary methods of trimming within an existing waveguide have been shown, the scope of the present disclosure also includes, however, altering the optical characteristics seen by a signal traveling within an existing waveguide by writing structures near the waveguide. Near-waveguide trimming may be used, for example, to affect coupling (i.e., affect the propagation length over which signal exchange occurs and the extent of this exchange) between two or more waveguides. Referring now to FIG. 9A, a coupler has two waveguides 300 and 302 existing in a substrate 304, which would be like the substrates described above. The waveguides 300, 302 are parallel over a substantial portion of their lengths and characterized by a separation distance, d, and a coupler length, L, extending between lines 303a and 303b. A beam of ultrashort laser pulses 306 like that of beam 104 is focused within the substrate 304 by a lens 308 at a position near and between the waveguides 300 and 302. Near, as used herein, means that an entire affected volume, or a portion thereof, is close enough to the waveguides 300 and/or 302 to alter the effective index of refraction of a light signal traveling therein, i.e., within an evanescent coupling region.

Figure 9B:
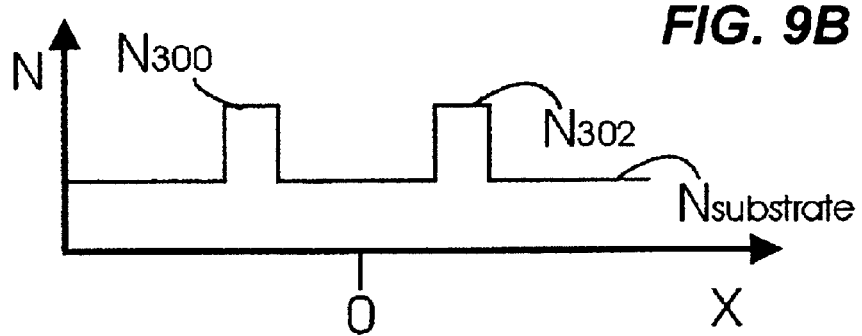
FIGS. 9B and 9C are plots of index of refraction of FIG. 9A before and after, respectively, a trimmed segment is formed.
Figure 9C:
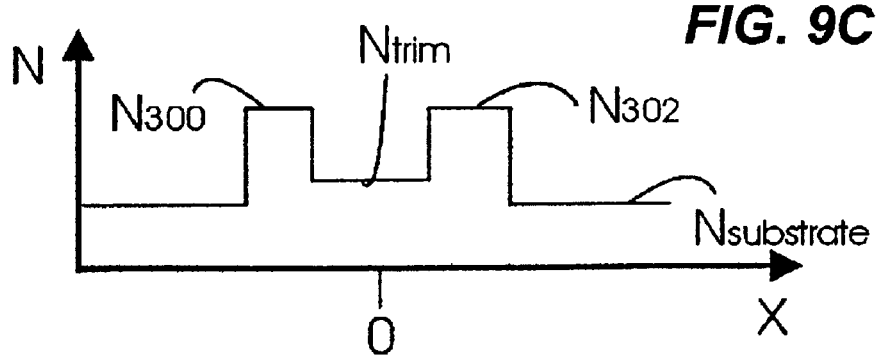

Using techniques described above, the beam 306 is moved to scan a longitudinal path within the evanescent coupling region in the substrate 304, resulting in a changed index of refraction profile and creating a trimmed segment 310 formed within the bulk of the substrate 304. An exemplary plot of the index of refraction along an x-axis of FIG. 9A, before the trimmed segment 310 is formed, is shown in FIG. 9B. The same plot is shown in FIG. 9C after formation of the trimmed segment 310. As shown, the index of refraction between the waveguides 300, 302 (i.e., between $n_{300}$ and $n_{302}$, respectively, i.e., $n_{trim}$) is increased over that of the $n_{substrate}$.

As the waveguides 300 and 302 are straight and parallel over their coupler length, L, the trimmed index region 310 would preferably be linear and parallel thereto to ensure that the entire trimmed index segment 310 is uniform within the evanescent coupling region. As will be appreciated, the trimmed segment 310, does not function as a propagating waveguide per se (compare FIG. 9C to FIG. 11B), but rather effectively alters the propagation of a signal within the waveguide 300 or 302, thereby altering the coupling between them. The effect of the trimmed segment 310 on waveguide 300 or 302 is to alter the effective index of refraction profile of a signal propagating therein. That is, the actual index of refraction within the waveguides has not been changed but the light traveling within the waveguides will be changed in phase and amplitude or mode profile. The length of the trimmed segment 310, its distance from the waveguides 300 and 302, and the extent of the changed index of refraction will determine the degree of the shift in mode profile and shift in phase. As with above, transverse, longitudinal, and where useful rotational movement of the beam 306 can be used to make the trimmed segment 310 of a desired shape, isotropic or anisotropic.

Alternatively, the modified index segment may be positioned near a waveguide but on the side opposite the other waveguide and trimmed in a similar manner to that described for between waveguide trimming. This would affect the waveguide coupling ratios in a complimentary fashion to that previously described.

As with the other embodiments, the waveguides 300 or 302 could be a planar waveguide or formed in the bulk of a single optical substrate or multiple layers forming an optical substrate. Additionally, the trimmed segment 310 and/or the waveguides 300, 302 could be further trimmed according to FIGS. 1–4 to form a graded, tapered, corrugated, or other longitudinal index of refraction profile. A particularly useful alternative would be to trim a corrugated overlay above (or below) the waveguides 300 and 302 and the evanescent region therebetween. An overlayed index of refraction pattern can effect a particular wavelength restriction (i.e., filter) on the coupling ratios of the waveguide pair 300, 302. Some other alternatives will be explained below.

The near-waveguide trimming described can be used in numerous structures to alter or improve performance. FIG. 10 shows a portion of an interleaver 400 similar to interleaver 200, in which the technique may be used to improve performance of a defective device. Instead of trimming within a waveguide in response to a problematic output pattern of the interleaver, a beam of ultra-short laser pulses 402 is focused within a substrate 404 at a position between and near two existing waveguides 406, 408. To ensure that beam 402 does not alter the properties within the waveguides 406, 408, an effective confocal region 409 of the beam extending between imaginary lines 410 and 412 is positioned to not overlap any of the waveguides 406, 408. In response to an output pattern 411 of the interleaver 400, derived from a reference beam 413, the beam 402 is scanned longitudinally between the waveguides 406 and 408 in the vicinity of the coupler segment to form an in-bulk, trimmed index of refraction segment 414, the length and width of which can be chosen to alter the output pattern 411 to adjust performance of the interleaver 400. Alternatively, the beam 402 can make multiple scans over at least a portion of the same physical length segment, each time modifying the effective index of refraction of the reference signal over a segment of the waveguides 406, 408. As the segment 414 is in evanescent contact with both waveguides 406, 408, the segment 414 will change coupling between the two resulting in a changed peak-to-valley signal contrast or channel isolation as would be seen in the output pattern 411. The adjusted performance of the interleaver 400 addresses channel isolation, channel uniformity, and to a lessor extent channel wavelength positioning. For a single interleaver in its simplest form, proper operation requires that the coupling ratio is 50% for both input and output couplers. Alternatively, there exists applications requiring multiple interleavers to be connected or cascaded requiring certain couplers to have ratios significantly different from 50% for proper operation.

The trimmed index segment 414 is written at the exit end output coupler of the interleaver 400, where the signal traveling in waveguide 406 has already undergone a phase shift relative to the signals traveling in the reference waveguide 408. The input coupler can be affected in a similar manner, as some corrective procedures require adjusting the coupling characteristics of both segments. Alternative near-waveguide direct-writing techniques may be used. For example, channel uniformity and isolation of interleaver or coupler-based devices can be affected by writing periodic or aperiodic, overlayed index of refraction patterns above and/or below the waveguides and in between evanescent regions comprising the coupler/splitter. Alternatively, writing of changed index of refraction patterns within the waveguides comprising the couplers/splitter of interleavers or coupler-based devices can affect coupling ratios, and their wavelength dependence results in a modified operation of the encompassing device. As the desired goal is to adjust operation of the interleaver 400 until the output therefrom is optimized, numerous near-waveguide writing structures could be formed to affect the designed output patterns.

Other alternatives may be employed. Coupling two or more waveguides is an integral part of many optical devices, however, there are problems with current coupling designs. For example, in couplers and splitters there is typically a first—straight waveguide parallel to and within the coupling distance of a straight portion of a second waveguide. In an ideal coupler, these two coupling segments would have near 100% coupling efficiency or power exchange over an appropriate propagation distance. Both waveguides typically have an arcuate portion at both ends of the straight portion extending away from the other waveguide. The problem is that, while it is desired to only couple between the straight portion of the first waveguide and the straight portion of the second waveguide, some of the arcuate segment of the second waveguide is within the coupling region of the first waveguide (and vice versa), as well. Though the actual position taper of the arcuate segments can be used to effect wavelength filtering on the couplers, the residual coupling within these segments can render the optimization of the coupling ratios problematic. The concept of a facilitator segment, as illustrated in FIG. 11A can solve this problem.

Figure 11A:
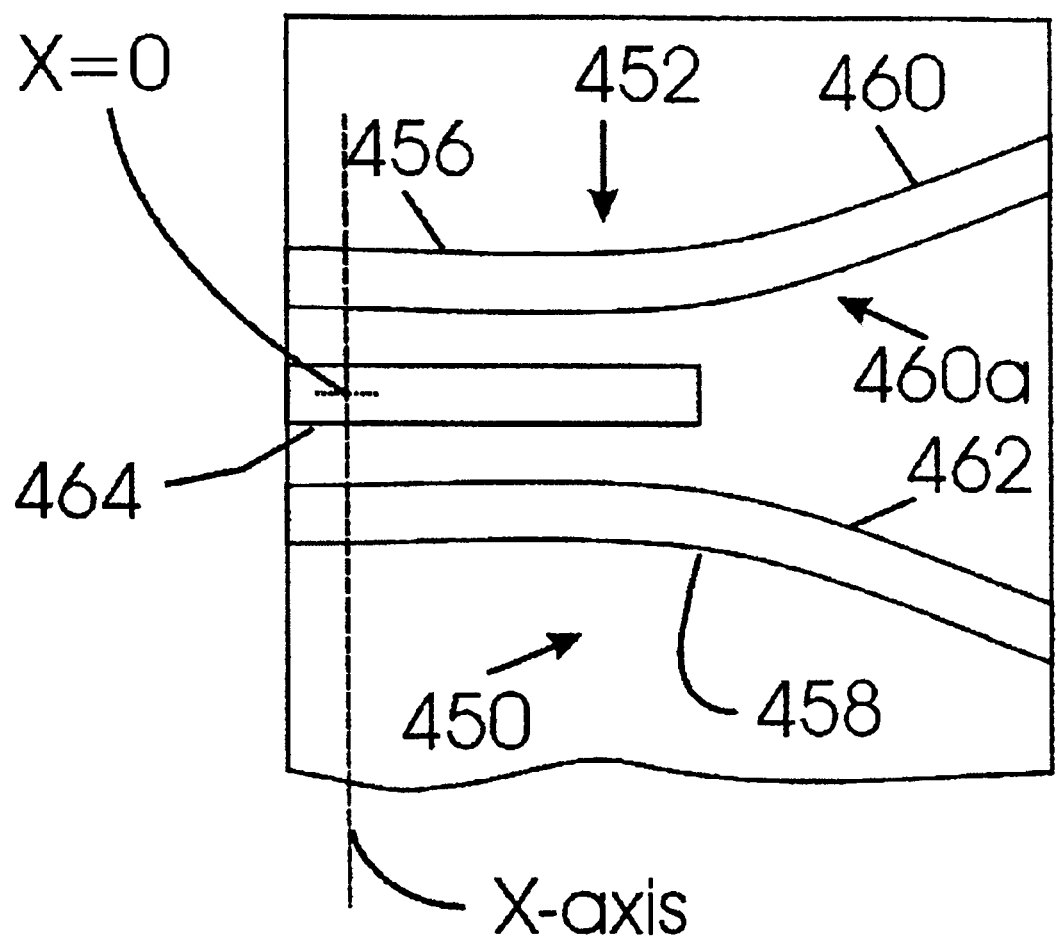
FIG. 11A is an illustration of a facilitator segment being formed within an optical substrate to facilitate coupling between waveguides otherwise out of coupling contact with one another.

FIG. 11A shows a two waveguide section of an optical device in which a first waveguide 450 and a second waveguide 452 exist within an optical substrate 454. The waveguides 450 and 452 could be formed in the bulk of the substrate or could be planar or formed from a sandwiching of multiple substrate layers. The waveguides 450 and 452 have straight waveguide segments 456, 458, respectively, that are disposed outside of the coupling regions of one another, at least for the distance over which they are parallel. The waveguides also have pairs of arcuate segments 460, 462, respectively, as well. The two waveguides 450, 452 are brought into coupling contact with one another by forming an in-bulk facilitator waveguide segment 464 using a beam of ultra-short laser pulses to perform a near-waveguide trimming technique previously described. The waveguide segment 464 is positioned to be simultaneously within the coupling region of both straight waveguide segments 456 and 458. Whereas before arcuate segment 460 would have a small portion, approximately 460a, that would have been in coupling contact with a similar portion of waveguide 462 if the two waveguides 450 and 452 were within coupling distance, with the facilitator segment 464 alone inducing the coupling, the coupling ratio is determined predominately from the length of the facilitator segment 464. The facilitator segment 464 is preferably isotropic, and the appropriate length of the segment 464 can be determined by providing a reference signal to the waveguide 452 and measuring any output from the waveguides 450 and 452 while writing the facilitator segment 464, that output representing signal coupling between the two waveguides over the length of the facilitator segment. The length of the segment 464 could be adjusted to optimize a desired coupling ratio. For example, the length of segment 464 could be adjusted to achieve 50% coupling between waveguides 450, 452, as would be necessary to create a 50% splitting ratio for a balanced optical splitter or combiner. The structure of FIG. 11A could be either a coupler or a splitter/combiner. Alternatively, different scanning configurations of the ultra-short pulse beam such as multiple scans across different segment lengths can also induce the desired coupling.

To optimize the affect of the segment 464, it is formed as a waveguide segment that allows some signal propagation. Therefore, the affect of the segment 464 on the index of refraction, as seen along an x-axis in FIG. 11A, is shown in the exemplary plot of FIG. 11B. Here, it can be seen that the trimmed segment 464 has an index of refraction $n_{trim}$, which is above $n_{substrate}$ and which is bounded by two regions of lower index of refraction, thus indicating that the segment 464 acts like a propagating waveguide.

Figure 12:
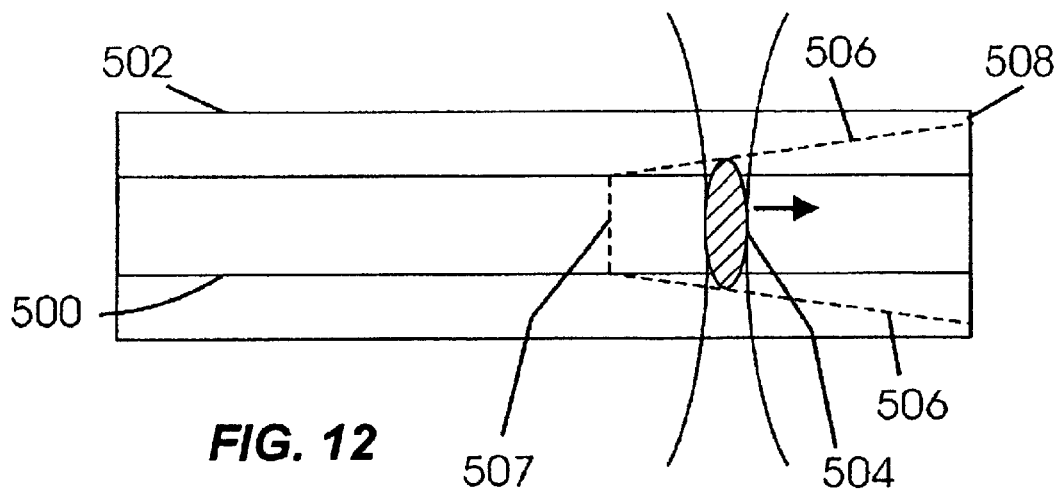
FIG. 12 is an illustration of an alternative form of near-waveguide trimming in which the longitudinal profile of a waveguide has been altered.

FIG. 12 shows another form of near-waveguide trimming. Here, a waveguide 500 existing within a substrate 502 has a uniform longitudinal waveguide profile, i.e., cross-sectional index profile and uniform cross-sectional area along its axis An ultra-short laser pulse light beam 504 is positioned within the substrate 502. As the light beam 504 scans in a longitudinal direction along the axis of the waveguide 500, the effective confocal region is altered so that the longitudinal profile of the waveguide 500 changes. To a limited degree, the size adjustment of the effective confocal region can be accomplished by increasing the intensity and/or the spot size of the focused beam 504 and thereby increase the resultant affected volume. Greater flexibility in forming waveguide shape and index tapers is afforded by fixing the size of the effective confocal region and incorporating transverse and longitudinal scanning along with retracing over selected trimmed regions. Dashed lines 506 show an exemplary increase in the width of the waveguide 500 along the longitudinal axis. The effective confocal region of the beam 504 is gradually increased or moved as it is scanned from a first end 507 to a second end 508 to form the resulting enlarged waveguide taper segment 506, that is, the affected volume shown in FIG. 12 has an enlarged tapered structure in comparison to the originating waveguide 500. To achieve uniformity in index of refraction profile across the entire waveguide 500, it may also be desirable to trim within the non-tapered portion of the waveguide 500 without altering the cross-sectional shape or area.

Waveguide segment 506 has a tapered longitudinal profile from the first end 507 to the second end 508. The cross-sectional profile of the waveguide 500 at end 507 is smaller than and concentric to the cross-sectional profile of the waveguide 500 at end 508, after the trimming step has been performed. Preferably the shapes at each cross-section would be identical, for example both would be rectangular or circular, though this need not be the case. The tapered segment 506 would be useful, for example, when the end 508 is to be attached to a fiber or some other structure having an aperture of larger cross-sectional area. For example, the end 507 could have a cross-sectional profile suitable for single-mode propagation and the end 508 could have a cross-sectional profile suitable for multi-mode propagation. This would be of interest in coupling non-single mode devices like diode lasers with single-mode fibers or waveguides. The larger cross-sectional area of the segment 506 could also be advantageous in eliminating the surface damage that can occur from the high intensities at the end of a waveguide.

Figure 13:
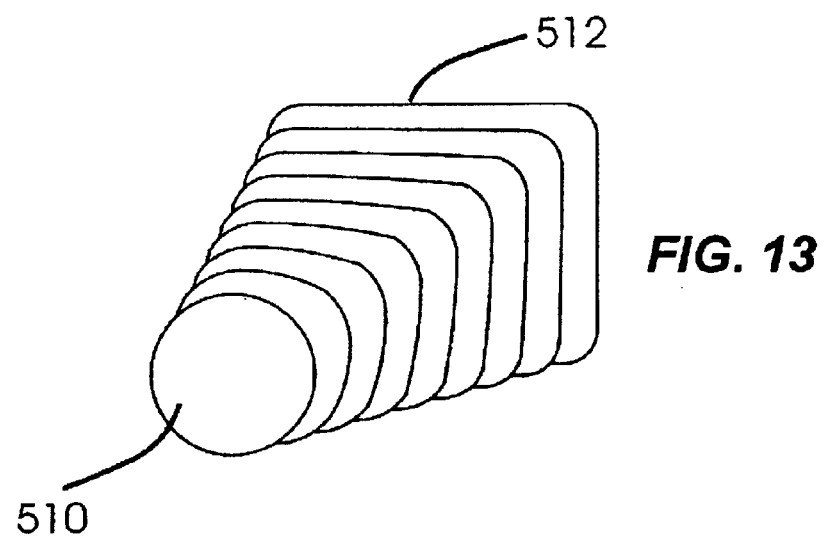
FIG. 13 is an illustration of an embodiment of FIG. 12 in which the waveguide of a first cross-sectional shape has been converted to different cross-sectional shape.

Further, the technique depicted in FIG. 12 is not limited to retaining the cross-sectional profile of the waveguide 500. The technique can also be used to provide a smooth transition between a circular waveguide and a rectangular waveguide, by adjusting the effective confocal region of the beam 504 and transversely moving the beam 504 during longitudinal scanning. An exemplary depiction of a resulting structure is shown in FIG. 13. Here a first end 510 of a waveguide with a substantially circular cross-sectional area is converted to a rectangular cross-sectional area at a second end 512. Furthermore, by re-scanning selected trimmed regions with the ultra-short pulse beam 504 one can generate various transverse index of refraction profiles. For non-birefringent tapers and interconnects, the trimmed index of refraction pattern could change radially over a cross-sectional profile of a waveguide.

The techniques discussed with reference to FIGS. 12 and 13 are particularly useful in the telecommunications industry. For example, Raman amplifiers are typically pumped at the highest possible average powers. Having higher pump powers is desired because it allows for higher gain Raman amplifiers. The Raman pump maximum average power is typically limited by the power handling capability of some passive elements, such as single mode couplers. As single mode fibers have cores on the order of a few microns in diameter, a high power light signal will result in very high intensities in the fiber, intensities high enough to induce damage at an end of the fiber where inevitably some contaminations do occur. Therefore, if the waveguide 500 before trimming is considered a single mode optical fiber and the surrounding substrate 502 the cladding thereof, then by increasing the cross-sectional area of the fiber at the end 508, where contaminants are most likely, the single mode fiber 500 may then be usable with Raman amplifiers at the higher pump power. Thus, though higher pump powers are used, the intensity at the end 508 of the fiber 500 is substantially reduced because of the increase in core cross-sectional area.

Figure 14:
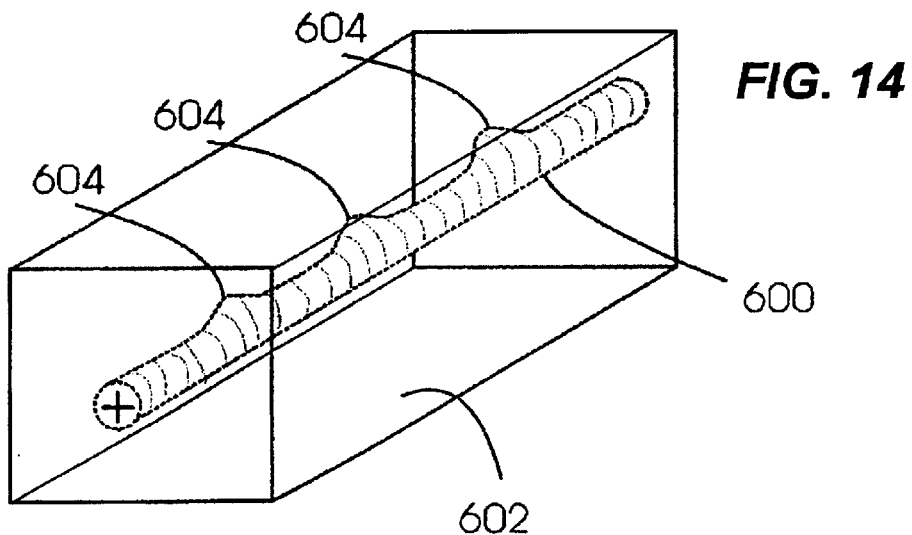
FIG. 14 is an illustration of a waveguide formed with corrugations by a near-waveguide trimming technique.

Referring now to FIG. 14, the concept depicted in FIG. 13 can be extended to form periodic corrugations or perturbations on the outer edge of an existing longitudinal waveguide profile. A waveguide 600 is formed in a substrate 602 with periodic corrugations 604 extending into the substrate 602. The height and length of the corrugations 604 can be chosen by adjusting either the effective confocal region of the ultra-short pulse writing beam or the transverse movement of the writing beam, as discussed above. The structure in FIG. 14 may be useful in forming an intra-waveguide DBR for tuning the wavelength of the output signal from the waveguide 600.

As indicated above, in the preferred embodiment trimming is implemented in closed-loop form, involving the analysis of an output signal or pattern to during trimming. Numerous types of output signals or patterns may be analyzed. The following are descriptions of some of the preferred ways in which a trimming can be affected by analyzing an output signal. As should become apparent, a number of different performance metrics may be measured for an optical device. Throughput, overall signal loss, comparative signal strengths between waveguides, PDL, PDF, and other metrics may be measured and used to affect trimming.

In general a test signal is used as input to a device under consideration and its throughput is analyzed with respect to certain characteristics of the signal. These signal characteristics are representative of a functionality of the device and can constitute a performance metric or mismatch between a measured value and a desired performance specification. A beam of ultra-short laser pulses is directed into the substrate of the device so to induce an affected volume near and/or within a waveguide of the device. Satisfactory methods are described above. Scanning a beam effective confocal region over a local region of the device will affect the signal characteristic through a change in the effective index of refraction of the signal, which is manifested as a change in the performance metric. As this metric decreases, the manner of scanning with the beam of ultra-short pulses is continued until the measured value is in agreement with the desired performance specification, that is the metric is nulled. An increasing performance metric is used to initiate a change in the manner of scanning the effective confocal region so as to achieve the desired decrease in the performance metric.

The test signal used to diagnose the device can be derived from a wavelength-tuneable, narrow-bandwidth laser or a wavelength-fixed, broad-bandwidth laser both operable over a wavelength range of interest, for example the telecommunications S, C, or L bands. Several characteristics of the input signal can be used to test the performance of waveguide-based devices. The signal throughput to be measured may be derived from one or more output waveguides from the device under consideration and may be analyzed with respect to the signal wavelength, polarization, amplitude, etc. Several embodiments of closed-loop trimming involving waveguide-based circuit components can be realized. Ultimately, the various performance metrics are associated with the overall circuit performance in relation to optical path length or phase errors, unbalance signal loading, PDL, PDF, unbalanced loss, and others. The following details several of these realizations. It is not intended to be all inclusive.

Trimming is applied to multi-waveguide couplers, splitters, and combiners for adjusting coupling ratios. For a two waveguide directional coupler, the effective confocal region is positioned either between the waveguides or on the opposite sides of the two waveguides for the complimentary effect. The analysis is based on the difference or ratio of the signal levels output from the waveguides and the performance metric is the difference between this measured ratio and the desired ratio. If scanning between the waveguides initiates an increase in this metric then the effective confocal region is redirected to the opposite sides of both waveguides and scanned along the waveguide or repeatedly scanned along the waveguide until the metric is nulled. This application of closed-loop trimming can be applied to couplers of three of more waveguides, as well, by establishing complimentary scanning patterns that affect the output signal ratios in an opposing manner.

A close variation of this application involves trimming within the waveguides of the coupler. The analysis is based on the wavelength dependence of the coupling ratios. For waveguides of different index contrast and diameters, efficient coupling occurs only near the wavelength at which the waveguide dispersion is equal. This dispersion crossover point can be tuned by changing the index of one waveguide relative to the other. If trimming within one waveguide increases the dispersion difference, then trimming within the other will decrease the dispersion difference. The performance metric associated with the deviation from a desired coupling ratio only near a specified wavelength can thus be nulled.

As previously described, trimming within a waveguide can be done so to induce an index anisotropy or to remove an existing birefringence. The trimmed anisotropic index pattern can be characterized by a major axis or the direction in which the pattern extends furthest. In-waveguide trimming can be applied to remove polarization dependence of coupling ratios. The performance metric here is associated with the deviation from a polarization independent coupling ratio. Here an increasing performance metric measured during scanning would be indication to change the major transverse trimming axis to an orthogonal direction and continue scanning until the metric is nulled (polarization dependence minimized).

Closed-loop trimming can be applied to interference-based devices in a variety of closely related embodiments. As previously described, a channel interleaver is a device with potentially multiple defective points anyone of which can compromise overall performance. The device is analyzed by propagating a broadband signal through anyone of the device inputs and measuring the spectral interference pattern or interferogram at the various output waveguides. Different performance metrics can be defined from this output signal pattern. One such example would be the difference between the measured wavelength position of the signal peaks (i.e. wavelength channels) and that of a specified wavelength grid (e.g. telecommunication ITU grid). To minimize this metric and therefore optimize channel positioning, the affected volume induced by the beam of ultra-short pulses is directed to uniformly fill the transverse cross-section of the waveguide and scanned along the propagation axis of a portion of the waveguide comprising the major branch of the interleaver (see, e.g., FIG. 8A). This action increases the optical path length of the major branch causing the measured wavelength channels to shift towards shorter wavelength with a small decrease in channel separation. Should this lead to an increase in the performance metric or an over-shoot of the zero metric, the effective confocal region is repositioned on the minor branch of the interleaver in a similar manner and scanned to null the metric. This process can be used to correct for phase errors in general multi-branched interference-based devices.

Another closely related performance metric associated with the measured interferograms from interleavers is the deviation from polarization independent channel wavelength or the degree of PDF. As described previously, trimming a polarization dependent index pattern requires positioning a sub-waveguide dimensioned effective confocal region and scanning both transversely and longitudinally. The resultant anisotropic index pattern can be characterized by a dominant axis or the transverse direction in which this index extends furthest. In this application, the trimming is done in two locales of the interleaver, one in the major branch and one in the minor branch (see, e.g., FIG. 8B). This is done to maintain the channel wavelength position while compensating for birefringence. A measured increase in the performance metric (i.e., increase in PDF) during the scan would indicate changing the scanning parameters and consequentially the cross-sectional index profile such that its dominant axis is now in an orthogonal direction. This two region trimming would be performed in an alternating manner until PDF is nulled.

The measured interferogram from an interleaver can be used to define yet another performance metric. The signal peak-to-valley difference or signal contrast represents channel isolation and should be maximized for proper device performance. Therefore, the performance metric may be defined as the difference between the measured signal contrast and some accepted minimal level of channel isolation. Different sources of error can contribute to a nonzero value of this metric, some of which are identified as unbalanced signal loading of the two arms, unbalanced signal loss between the two arms, and PDL. The first of which can be compensated for by trimming to adjust for coupling ratios in the input and output couplers of the interleaver. The scanning configuration previously described for couplers is implemented here incorporating the interferogram analysis and the contrast-based performance metric. Alternatively, channel isolation may be compromised due to unbalanced signal loss between the two arms of the interleaver. Again, the same performance metric can be implemented, but the trimming is performed by positioning the effective confocal region within one arm of the interleaver and inducing a longitudinal step index change (see, e.g., FIG. 6), which in turn induces reflection loss. Should an increase in the performance metric (decrease in signal contrast) be observed, the affected volume is re-scanned over the region of the step index change to establish a smoother index gradient and reduced reflection loss. The effective confocal region is then redirected to the other arm of the interleaver so to induce a longitudinal step index change and corresponding reflection loss. The affected volume is retraced to successively increase the index step size thereby increasing the reflection loss and decreasing the performance metric. The process is continued until the metric is nulled (channel isolation maximized).

In each of these exemplary implementations, the performance metric could be measured using known equipment, and, the measurement thereof would be used, in a closed-loop manner, to guide the translation/rotation stage of the writing ultra-short laser pulses using known equipment and control software.

The above described techniques will greatly reduce manufacturing cost and increase manufacturing yields of waveguide structures like AWG and interleavers, or any device that operates on the basis of optical interference. The integration of post-processing and quality control in the manufacturing of optical waveguide circuits improves production yields. Ultra-short laser technology is presently suited for applications in production environments making the integration of the above trimming techniques into device fabrication processes relatively easy. Incorporation of this laser technology with automated motion and imaging control of the sample, for example, to automatically trim a waveguide in response to a sensor recorded output pattern of a defective device, and parameter control of the laser beam are further implementations enabling this integration.

The foregoing are but a few of the ways in which in-waveguide and near-waveguide index trimming through the use of an ultra-short pulse laser beam can improve or alter performance of waveguide based devices. Those of ordinary skill in the relevant art will recognize other beneficial applications of these techniques in improving performance and manufacturing yield of these and other structures. Any of the disclosed techniques could be combined with other disclosed techniques to further improve device operation. In fact, the embodiments described above are provided in part because the waveguides therein discussed are constituent elements of a great number of optical devices that may benefit from the novel approaches now described. And such optical devices are considered within the scope of the claimed subject matter.

We claim:

1. A method of coupling a first waveguide and a second waveguide, wherein at least one of the first and second waveguides exists within an optical medium, the method comprising the steps of:

generating ultra-short laser pulses;

applying a signal to the first waveguide and the second waveguide for measuring an output derived from the first waveguide and the second waveguide, the output being indicative of a performance metric of the first waveguide and the second waveguide; and in response to the measured output, directing the ultra-short laser pulses within the bulk of the optical medium to write a facilitator segment such that the facilitator segment is within an evanescent coupling region of the first waveguide and within an evanescent coupling region of the second waveguide.

2. The method of claim 1, wherein the first waveguide and the second waveguide are formed within the bulk of the optical medium.

3. The method of claim 1, wherein the first waveguide is disposed substantially outside the evanescent coupling region of the second waveguide over a given length of the first waveguide.

4. The method of claim 3, wherein the facilitator segment is a waveguide.

5. The method of claim 1, wherein the first waveguide and the second waveguide collectively form an optical coupler and wherein the step of directing the ultra-short laser pulses further comprises the step of adjusting the length of the facilitator segment so as to induce substantially 100% coupling between the first waveguide and the second waveguide.

6. The method of claim 1, wherein the first waveguide and the second waveguide collectively form an optical splitter and wherein the step of selectively moving the ultra-short laser pulses further comprises the step of adjusting the length of the facilitator segment so as to induce a desired splitting ratio between the first waveguide and the second waveguide.

* * * * *